(12) United States Patent
Pusdesris et al.

(10) Patent No.: US 11,188,475 B1
(45) Date of Patent: Nov. 30, 2021

(54) APPARATUS AND METHOD FOR MANAGING CACHES IN A CACHE HIERARCHY

(71) Applicant: Arm Limited, Cambridge (GB)

(72) Inventors: Joseph Michael Pusdesris, Austin, TX (US); Balaji Vijayan, Austin, TX (US)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 17/061,965

(22) Filed: Oct. 2, 2020

(51) Int. Cl.
*G06F 12/0897* (2016.01)
*G06F 12/0871* (2016.01)
*G06F 12/14* (2006.01)
*G06F 12/02* (2006.01)
*G06F 12/0864* (2016.01)

(52) U.S. Cl.
CPC ...... *G06F 12/0897* (2013.01); *G06F 12/0246* (2013.01); *G06F 12/0864* (2013.01); *G06F 12/0871* (2013.01); *G06F 12/1483* (2013.01)

(58) Field of Classification Search
CPC .................................................. G06F 12/0897
USPC ......................................................... 711/154
See application file for complete search history.

(56) References Cited

U.S. PATENT DOCUMENTS

2005/0125592 A1* 6/2005 Sawdey .............. G06F 12/0864
711/3

* cited by examiner

*Primary Examiner* — Jae U Yu
(74) *Attorney, Agent, or Firm* — Nixon & Vanderhye P.C.

(57) ABSTRACT

A technique is provided for managing caches in a cache hierarchy. An apparatus has processing circuitry for performing operations and a plurality of caches for storing data for reference by the processing circuitry when performing the operations. The plurality of caches form a cache hierarchy including a given cache at a given hierarchical level and a further cache at a higher hierarchical level. The given cache is a set associative cache having a plurality of cache ways, and the given cache and the further cache are arranged such that the further cache stores a subset of the data in the given cache. In response to an allocation event causing data for a given memory address to be stored in the further cache, the given cache issues a way indication to the further cache identifying which cache way in the given cache the data for the given memory address is stored in. In response to the allocation event, the further cache not only stores the data for the given memory address, but also retains the way indication whilst the data for the given memory address remains stored within the further cache. When the further cache subsequently issues a message to the given cache relating to the data for the given memory address, it provides the way indication to the given cache for use in controlling an access to the given cache.

21 Claims, 5 Drawing Sheets

US 11,188,475 B1

APPARATUS AND METHOD FOR MANAGING CACHES IN A CACHE HIERARCHY

BACKGROUND

The present technique relates to an apparatus and method for managing caches in a cache hierarchy.

It is common in data processing systems to provide a cache hierarchy interposed between processing circuitry and memory. In particular, the processing circuitry may be arranged to execute instructions in order to perform processing operations on data items, and both the instructions to be executed and the data items to be processed may be stored in memory. In order to allow quicker access to such instructions and data items, caches can be provided to cache a subset of that information to allow quicker access to it by the processing circuitry. Often more than one level of cache is provided so as to form a cache hierarchy, with a request from the processing circuitry first causing an access to be performed in the cache at the highest hierarchical level to see if the requested information is available for access therein, and only in the event that the information is not present in that cache is the request propagated to a cache at a lower hierarchical level.

In some implementations, one or more of the caches in the hierarchy may be arranged to operate in an inclusive arrangement with another cache in the hierarchy. For example, a cache at a particular hierarchical level may be arranged to have a smaller capacity than a cache at an adjacent lower hierarchical level. That smaller cache will typically be quicker and more power efficient to access, but in the event of a miss in that cache the request can be propagated on to the larger adjacent lower level cache. The two caches may be arranged so that the higher level cache stores a subset of the data residing within the lower level cache, and in such instances the caches are considered to be operating in an inclusive arrangement.

When adopting such an arrangement of caches, it is often the case that when certain actions are taken in respect of the information stored in a cache line in the cache at the higher hierarchical level, for example clean and/or invalidate operations, then a message needs to be sent to the cache at the lower hierarchical level in order to cause an access to be made within that lower level cache to take account of the action performed within the higher level cache, for example to identify that the higher level cache is no longer storing a copy of that information, and/or to update the copy of that information stored in the lower level cache.

In modern data processing systems, it is increasingly important to seek to reduce power consumption wherever possible, and the techniques described herein seek to reduce the power consumption associated with caches in a cache hierarchy.

SUMMARY

In one example arrangement, there is provided an apparatus comprising: processing circuitry to perform operations; and a plurality of caches to store data for reference by the processing circuitry when performing the operations, the plurality of caches forming a cache hierarchy and comprising at least a given cache at a given hierarchical level in the cache hierarchy, and a further cache at a higher hierarchical level than the given hierarchical level; wherein: the given cache is arranged as a set associative cache having a plurality of cache ways; the given cache and the further cache are arranged such that the further cache stores a subset of the data in the given cache; the given cache is arranged, in response to an allocation event that causes data for a given memory address to be allocated into the further cache, to issue a way indication to the further cache identifying which cache way in the given cache the data for the given memory address is stored in; the further cache is arranged, in response to the allocation event, to store the data for the given memory address, and to retain the way indication whilst the data for the given memory address remains stored within the further cache; and the further cache is arranged, when issuing a message to the given cache relating to the data for the given memory address, and which requires an access to be made in the given cache, to provide the way indication to the given cache for use in controlling the access to the given cache.

In another example arrangement, there is provided a cache device for use in a cache hierarchy, comprising: a storage structure to store cached data, wherein the storage structure is arranged as a set associative storage structure having a plurality of cache ways; and access control circuitry to control access to the storage structure; wherein: the cache device forms a given cache at a given hierarchical level in the cache hierarchy and is arranged such that a further cache at a higher hierarchical level in the cache hierarchy than the given hierarchical level stores a subset of the data in the given cache; the given cache is arranged, in response to an allocation event that causes data for a given memory address to be allocated into the further cache, to issue a way indication to the further cache identifying which cache way in the given cache the data for the given memory address is stored in; and the access control circuitry is arranged, in response to a message received from the further cache relating to the data for the given memory address, and which requires an access to be made in the given cache, to control access to the given cache in dependence on the way indication returned by the further cache to the given cache with the message.

In a still further example arrangement, there is provided a cache device for use in a cache hierarchy, comprising: a storage structure to store cached data; and a way indication storage to retain way indicators; wherein: the cache device is coupled to a given cache at a given hierarchical level in the cache hierarchy, where the given cache has a set associative storage structure having a plurality of cache ways; the cache device forms a further cache at a higher hierarchical level than the given hierarchical level; the further cache is arranged to store a subset of the data in the given cache; the further cache is arranged, in response to an allocation event that causes data for a given memory address to be allocated into the further cache, to receive from the given cache a way indication identifying which cache way in the given cache the data for the given memory address is stored in; the further cache is further arranged, in response to the allocation event, to store the data for the given memory address in the storage structure, and to retain the way indication in the way indication storage whilst the data for the given memory address remains stored within the storage structure; and the further cache is arranged, when issuing a message to the given cache relating to the data for the given memory address, and which requires an access to be made in the given cache, to provide the way indication to the given cache for use in controlling the access to the given cache.

In a yet further example arrangement, there is provided a method of managing caches in a cache hierarchy, comprising: providing a plurality of caches in the cache hierarchy to store data for reference by processing circuitry when performing operations, the plurality of caches comprising at least a given cache at a given hierarchical level in the cache hierarchy, and a further cache at a higher hierarchical level than the given hierarchical level; arranging the given cache as a set associative cache having a plurality of cache ways; arranging the given cache and the further cache such that the further cache stores a subset of the data in the given cache; issuing from the given cache, in response to an allocation event that causes data for a given memory address to be allocated into the further cache, a way indication to the further cache identifying which cache way in the given cache the data for the given memory address is stored in; in response to the allocation event, storing in the further cache the data for the given memory address, and retaining in the further cache the way indication whilst the data for the given memory address remains stored within the further cache; and when issuing from the further cache a message to the given cache relating to the data for the given memory address, which requires an access to be made in the given cache, providing the way indication to the given cache for use in controlling the access to the given cache.

In another example arrangement, there is provided an apparatus comprising: processing means for performing operations; and a plurality of cache means for storing data for reference by the processing means when performing the operations, the plurality of cache means forming a cache hierarchy and comprising at least a given cache means at a given hierarchical level in the cache hierarchy, and a further cache means at a higher hierarchical level than the given hierarchical level; wherein: the given cache means is arranged as a set associative cache having a plurality of cache ways; the given cache means and the further cache means are arranged such that the further cache means is for storing a subset of the data in the given cache means; the given cache means is arranged, in response to an allocation event that causes data for a given memory address to be allocated into the further cache means; to issue a way indication to the further cache means identifying which cache way in the given cache means the data for the given memory address is stored in; the further cache means is arranged, in response to the allocation event, to store the data for the given memory address, and to retain the way indication whilst the data for the given memory address remains stored within the further cache means; and the further cache means is arranged, when issuing a message to the given cache means relating to the data for the given memory address, and which requires an access to be made in the given cache means, to provide the way indication to the given cache means for use in controlling the access to the given cache means.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
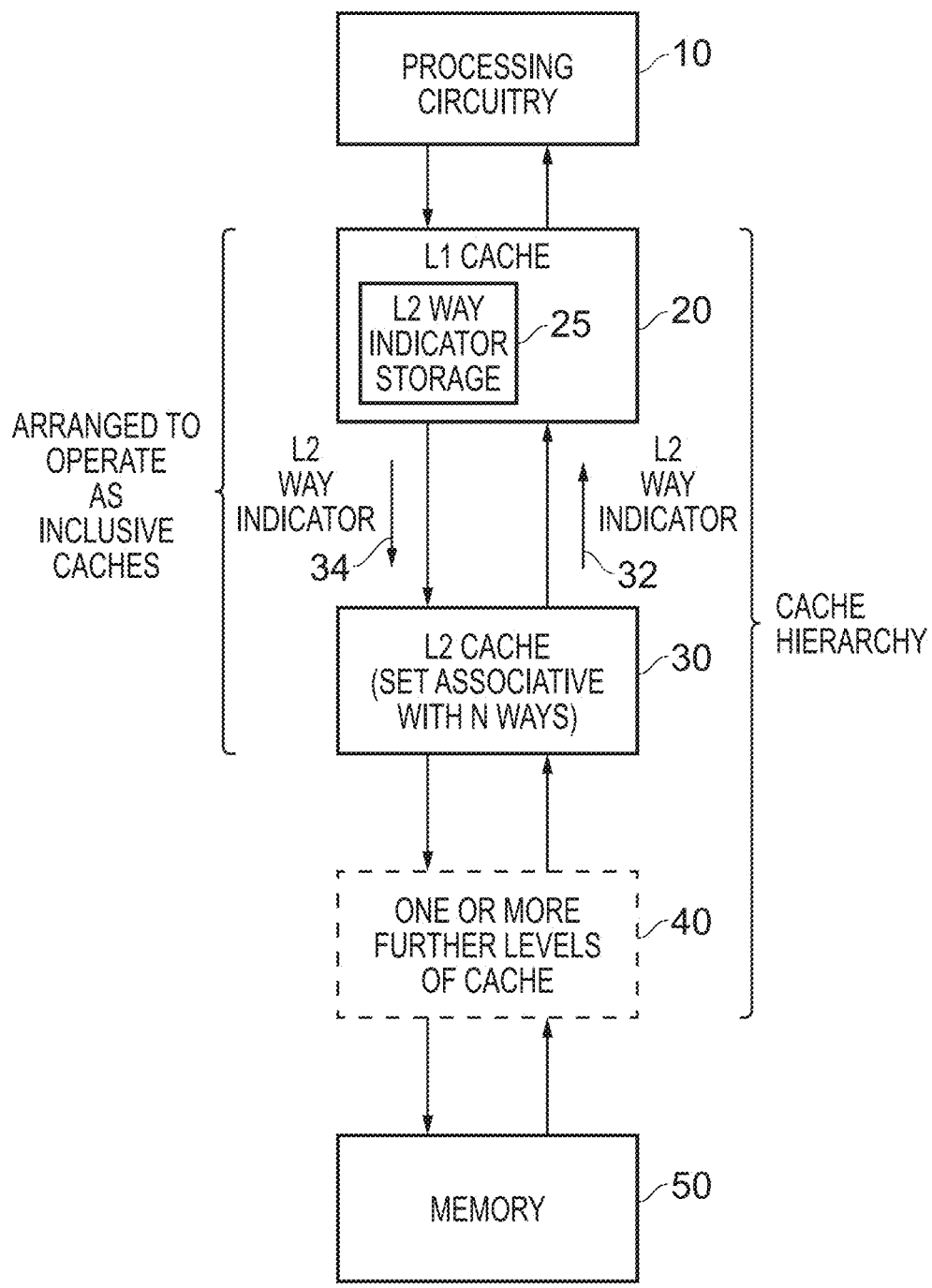
FIG. 1 is a block diagram of a system in which the techniques described herein may be employed.

As mentioned earlier, when two caches in a cache hierarchy are operating in an inclusive arrangement, and certain actions are taken in respect of the cache at the higher hierarchical level, such as the performance of a clean and/or invalidate operation in respect of a cache line of that cache, this will typically result in a message being sent to the lower level cache in that pair of caches that causes an access to be performed in that lower level cache. In particular, as mentioned earlier, when operating in an inclusive arrangement, the cache at the higher hierarchical level will store a subset of the data cached in the cache at the lower hierarchical level, and accordingly when such actions are taken in the cache at the higher hierarchical level there may be a need to update the corresponding information held in the cache at the lower hierarchical level. This may involve, for example, updating the relevant entry in the cache at the lower hierarchical level to identify that the cache at the higher hierarchical level no longer is caching the data, and in some instances may also require the copy of the data held in the lower level cache to be updated, for instance because the data as cached at the higher hierarchical level was marked as dirty, i.e. was more up-to-date than the copy held in the lower hierarchical level.

Hence, receipt of such messages from the cache at the higher hierarchical level will typically require a lookup to be performed within the cache at the lower hierarchical level. The performance of this lookup operation can consume significant power, and accordingly it would be desirable to reduce the power consumption associated with the handling of such messages from the cache at the higher hierarchical level.

In accordance with the techniques described herein an apparatus is provided that has processing circuitry for performing operations, and a plurality of caches to store date for reference by the processing circuitry when performing the operations. The plurality of caches form a cache hierarchy, and comprise at least a given cache at a given hierarchical level in the cache hierarchy, and a further cache at a higher hierarchical level than the given hierarchical level. Further, the given cache is arranged as a set associative cache having a plurality of cache ways, and the given cache and the further cache are arranged such that the further cache stores a subset of the data in the given cache. It should be noted that the further cache may also be arranged as a set associative cache, but in alternative implementations different arrangements could be used, and hence for example the further cache could be a fully associative cache.

In response to an allocation event that causes data for a given memory address to be allocated into the further cache, then due to the inclusive arrangement being adopted in respect of the given cache and the further cache this will mean that the data for that given memory address will also be cached within the given cache. That data may already be cached in the given cache, or may be allocated into the given cache due to the same allocation event that is causing the data to be allocated into the further cache. In either event, in accordance with the techniques described herein the given cache is arranged to issue a way indication to the further cache identifying which cache way in the given cache the data for the given memory address is stored in.

The further cache is arranged, in response to the allocation event, to store the data for the given memory address, and in addition to retain the way indication information that has been provided from the given cache, at least whilst the data for the given memory address remains stored within the further cache. It will be appreciated that this way indication information is of no particular use to the further cache itself. However, the further cache is arranged, when issuing a message to the given cache relating to the data for the given memory address, and which requires an access to be made in the given cache, to provide the way indication to the given cache for use in controlling the access to the given cache. It has been found that, by providing this way indication information back to the given cache, this can significantly reduce the power consumption involved in performing the access to the given cache. In particular, a more targeted access into the given cache can be performed based on the way indication information that indicates which cache way in the given cache the relevant data is stored in. This avoids the need for a full lookup procedure to be adopted in order to determine where the data is stored within the given cache.

In one example implementation, the given cache comprises a storage structure to store the data cached within the given cache, and also has access control circuitry to control access to the storage structure. The storage structure comprises a plurality of storage blocks, and the access control circuitry is arranged, when performing the access required by the message, to exclude one or more of the storage blocks from the access, as determined from the way indication. By being able to exclude one or more of the storage blocks from the access, this can significantly reduce the power consumption associated with the handling of the message from the further cache.

In one particular example implementation, the access control circuitry is arranged, when performing the access, to only access one or more of the storage blocks associated with the cache way identified by the way indication provided from the further cache. Hence, in this example implementation the only storage blocks accessed will relate to the cache way that has been identified by the way indication, thus enabling access to a significant number of the storage blocks to be avoided.

There are a number of ways in which accesses to the unnecessary storage blocks can be disabled during the access procedure. However, in one example implementation each of the storage blocks has a select signal, and the access control circuitry is arranged to disable the select signal for each storage block to be excluded from the access. It should be noted that whilst the select signal may be settable independently for every storage block, it may be that the same select signal is used for multiple of the storage blocks. For example, the select signals may be generated for each of the cache ways, so that when a select signal is disabled for a particular cache way, this causes all of the storage blocks associated with that cache way to be disabled.

In one example implementation, the plurality of storage blocks comprises a plurality of data storage blocks and a plurality of address indication storage blocks. Each data storage block comprises a plurality of cache lines used to store data, and each address indication storage block has a plurality of entries, where each entry is used to store a memory address indication for the data stored in a corresponding cache line. In implementations based on random access memory (RAM) technology, each data storage block may be referred to as a data RAM, and each address indication storage block may be referred to as a TAG RAM, where the TAG identifies a common portion of a memory address relevant to all of the data values stored in a corresponding cache line of the data RAM. In implementations comprising such data storage blocks and address indication storage blocks, each cache way may be formed by at least one address indication storage block and at least one data storage block.

In one example implementation, the access control circuitry is arranged to exclude from the access all address indication storage blocks that are not associated with the cache way identified by the way indication. Hence, in such implementations, the only lookup required in respect of the address indication storage blocks is in respect of the one or more address indication storage blocks that are associated with the cache way identified by the way indication. Considering the earlier TAG RAM example, it may be that there is a single TAG RAM for each cache way, or it may be that there is more than one TAG RAM covering a cache way. In either event, only the subset of the TAG RAMS associated with the cache way identified by the way indication need to be accessed.

Depending on the type of message received from the further cache, it may or may not be the case that the data storage blocks need to be accessed. For example, if the data in the further cache is marked as dirty for a particular cache line, and that cache line is to be invalidated in the further cache, then the copy of the data held in that cache line in the further cache will be provided to the given cache, to enable the given cache's copy of that data to be updated. In that event, it will be necessary to access the relevant data storage block in order to store the updated data. However, in accordance with the techniques described herein, the access control circuitry may be arranged to exclude from the access all data storage blocks that are not associated with the cache way identified by the way indication. Considering the earlier example of data RAMs, it may be that there is a single data RAM for each cache way, in which case it may only be necessary to access a single data RAM. Even if there is more than one data RAM for a cache way, it will be appreciated that only the subset of data RAMs associated with the relevant cache way may need to be accessed.

In some example implementations, it may be the case that for certain messages received from the further cache, there is no need for any of the address indication storage blocks to be accessed. In particular, it may be the case that an update within the relevant data storage block can be performed directly based on the way indication information provided from the further cache, without any check being performed within the address indication storage blocks. In such an example implementation, the access control circuitry may be arranged to exclude from the access all address indication storage blocks, and to limit the access to the at least one data storage block associated with the cache way identified by the way indication.

As discussed earlier, the message issued by the further cache may occur in result to a number of different operations performed in respect of the further cache. In one example implementation, the message is issued by the further cache in response to an invalidation operation performed within the further cache for the data for the given memory address. Hence, in such a situation the further cache's copy of the data is being invalidated, and accordingly the given cache is being notified that the further cache no longer holds a copy of that data. In one such example implementation, the access may be performed by the given cache in response to the message in order to update an inclusion flag maintained by the given cache in association with the data for the given memory address as stored in the given cache, to identify that the further cache no longer stores that data. In particular, the given cache may maintain an inclusion flag for each cache line of the given cache, to identify whether the data stored in that cache line is also held in the further cache or not, and that information can be updated when the earlier-mentioned invalidation operation causes the further cache to no longer store a copy of the data. By providing the way indication information, the access required in the given cache can be targeted to the relevant storage block(s) for the cache way in question that is used to maintain the inclusion flag information. In one example implementation this inclusion flag information is stored within the address indication storage blocks, and accordingly the access can be limited to the subset of address indication storage blocks associated with the relevant cache way.

Further, in one example implementation, when a version of the data for the given memory address as stored in the further cache is more up to date than a version of the data stored in the given cache, the message is arranged to provide the version of the data from the further cache, and the access by the given cache in response to the message is further arranged to update the version of the data as held in the given cache. In this instance, the access to the data storage blocks can be limited to the subset of data storage blocks associated with the cache way in question.

The earlier-mentioned invalidation operation can arise for a variety of reasons. For example, the invalidation operation may be performed due to an eviction from the further cache of the data for the given memory address, for example to make space in the further cache for new data that requires allocating into the further cache for a different memory address. Alternatively, the invalidation operation may be performed due to a clean and invalidate operation performed in the further cache for the data for the given memory address, as may arise when performing cache maintenance operations.

As another example of why a message may be issued from the further cache to the given cache, the message may be issued by the further cache in response to a clean operation performed within the further cache for the data for the given memory address, where subsequent to the clean operation being performed the data for the given memory address is retained within the further cache. It should be noted that this is different to a clean and invalidate operation, as the data in question is still being retained within the further cache. Hence, the earlier-mentioned inclusion flag will not need to be updated, but as a result of the clean operation it may still be necessary to update the copy of the data held in the given cache, in particular where the copy as held in the further cache is more up-to-date.

The manner in which the further cache retains the way indication information may vary dependent on implementation. For example, a dedicated RAM structure, or a set of flops, could be used to retain that way indication information. However, in one example implementation the further cache is arranged to retain the way indication within a storage structure of the further cache that is also used to store memory address indications for the data stored in the further cache. Hence, the way indication may be stored within the earlier-mentioned address indication storage blocks. Alternatively, if desired, the way indication information could be stored within the earlier-mentioned data storage blocks.

The cache hierarchy can be organised in a variety of ways, but in one example implementation comprises a level 1 cache at a highest hierarchical level and one or more further caches each of which is at an associated lower hierarchical level in the cache hierarchy.

Further, in one example implementation the given cache and the further cache are at adjacent hierarchical levels in the cache hierarchy. In one particular example implementation, the further cache is the level one cache, and the given cache is a level two cache in the cache hierarchy.

The data stored in the caches can take a variety of forms. It may for example comprise data items on which the operations are performed, but alternatively, or in addition, may comprise instructions used to identify to the processing circuitry the operations to be performed. In some implementations, separate data and instruction caches are provided at at least the highest hierarchical level in the cache hierarchy, but at one or more lower levels a unified cache structure may be used to store both the data items and the instructions. The techniques described herein can be utilised in association with caches storing data items, instructions, or both.

Particular examples will now be described with reference to the figures.

FIG. 1 is a block diagram of a system in accordance with one example implementation. As shown in FIG. 1, processing circuitry 10 is provided for performing data processing operations. The instructions that need to be executed by the processing circuitry in order to perform those operations may be stored within memory 50, as may the data items processed by the processing circuitry when performing those operations. A cache hierarchy comprising a plurality of caches may be interposed between the processing circuitry 10 and memory 50 to seek to improve the access time to instructions and/or data items for the processing circuitry, relative to the time that would be required had those instructions and/or data items needed to be accessed directly from memory 50. The techniques described herein can be employed in respect of caches storing instructions and/or data items, and hereafter the information stored in the caches will merely be referred to as data.

The cache hierarchy in FIG. 1 includes a level one cache 20 at the highest hierarchical level, and one or more lower level caches 30, 40 at lower hierarchical levels in the cache hierarchy. Within the cache hierarchy there is at least two caches that are arranged to operate in an inclusive arrangement. In the particular example shown, the level one cache 20 and the level two cache 30 are arranged to operate as inclusive caches. In accordance with such an inclusive cache arrangement, a copy of all data that is cached in the level one cache 20 is also cached in the level two cache 30. Typically the level two cache 30 will be larger than the level one cache 20, and accordingly the level one cache 20 stores a subset of the data stored in the level two cache 30. The level two cache 30 can be viewed as being an example of the earlier-mentioned "given cache", and the level one cache 20 can be viewed as being an example of the earlier-mentioned "further cache".

Whilst in the example of FIG. 1 it is the level one cache 20 and the level two cache 30 that form a pair of inclusive caches, the techniques described herein are not restricted to use in association with the level one and level two caches, but instead can be employed in association with any suitable pair of caches that are arranged to operate in an inclusive manner, and where at least the cache at the lower hierarchical level in the pair is organised as a set associative cache comprising a plurality of ways.

As shown in FIG. 1, the level two cache 30 is an N-way set associative cache. The level two cache 30 has a storage structure for storing the data cached within that cache, where that storage structure comprises a plurality of storage blocks, and with each storage block being associated with one of the cache ways. Access control circuitry is also provided within the level two cache 30 to perform any accesses required to the storage structure in order to perform read or write operations on the data stored therein.

When an allocation event occurs that causes a cache line's worth of data to be allocated into the level one cache 20, then the required data will typically be provided to the level one cache 20 from the level two cache 30. That data may already be stored within the level two cache, or may have been retrieved from a lower level of cache 40 or memory 50, in which event that data will also be being allocated into the level two cache in addition to being allocated into the level one cache. In this latter case, the data can be provided to the level one cache before the level two cache has actually performed the allocation if desired, but typically no allocation will be made into the level one cache until the allocation has been made into the level two cache, as by adopting such a constraint this can simplify the issue of cache coherency.

In accordance with the techniques described herein, when an allocation event requires data to be allocated into the level one cache 20, then the level two cache 30 is arranged to provide a level two way indicator to the level one cache 20, as indicated by the arrow 32 in FIG. 1. This level two way indicator identifies which way within the level two cache has been used to store the data that is also going to be allocated into the level one cache 20.

The level one cache 20 is provided with a storage 25 within which the level two way indicator provided from the level two cache 30 can be retained, at least whilst the corresponding data remains stored within the level one cache 20. The storage 25 may be a dedicated storage used to store level two way indicators, or alternatively an additional field may be provided within the existing storage structures of the level one cache to capture that information. Indeed, as will be discussed in more detail later with reference to FIG. 3, in one example implementation each entry in the TAG RAM storage blocks provided within the level one cache for storing address indication data for the data held in a corresponding cache line within the level one cache is extended to incorporate a field that can be used to capture the level two way indicator information for the data in the corresponding cache line.

Whilst the level two way indicator information is not used by the level one cache 20 itself, when certain events occur within the level one cache that result in messages being propagated to the level two cache 30, then at least when such a message requires an access to be made in the level two cache, the level two way indicator information for the relevant data associated with that message is propagated back to the level two cache 30, as indicated by the arrow 34. This information can be used by the access control circuitry within the level two cache to perform a more targeted access into the level two cache 30, thereby reducing power consumption. In particular, the access performed within the level two cache can be restricted to the particular subset of storage blocks within the level two cache that are associated with the cache way indicated by the level two way indicator.

In accordance with the inclusive cache arrangement, the level two cache remains responsible for any data cached within the level one cache, and accordingly needs to maintain a record for that data at least whilst the data is retained within the level one cache. Accordingly, it will update that record when certain events occur within the level one cache 20, for example when a clean and/or invalidate operation is performed within the level one cache. In particular, the level two cache may keep track of whether the data is or is not still cached by the level one cache, and accordingly if the level one cache 20 invalidates data for a particular memory address, for example so as to free up the cache line containing that data to store data for another address, then the level two cache may be arranged to update its record to identify that the level one cache no longer contains a copy of that data. This will typically require an access to be performed in the level two cache to update the necessary information, and by using the level two way indicator information returned from the level one cache, the access can be targeted to only the particular subset of storage blocks of interest. In one example implementation, an inclusion flag is retained within each entry of an address indication storage block (also referred to herein as a TAG RAM) of the level two cache to identify whether the data stored in an associated cache line of a corresponding data storage block of the level two cache (also referred to herein as a data RAM) is or is not cached within the level one cache 20, and this inclusion flag can be updated in response to a message from the level 1 cache resulting from such an invalidation in the level 1 cache.

As another example of a type of message that may be received from the level one cache 20, that requires an access into the level two cache 30, if a clean operation is performed on a particular cache line in the level one cache, and the data stored therein is marked as dirty, indicating that it is more up-to-date than the version of the data held elsewhere, then that copy of the data will need to be returned to the level two cache, so that the level two cache's copy can be updated, and this will require an access into the relevant data RAM. By using the level two way indicator information 34, the access can be restricted so that only the storage block(s) relevant to the cache way identified by the level two way indicator need to be accessed. Whilst in some implementations an update of the data held in a particular cache line of a data RAM in the level two cache 30 may be performed without needing to perform an access into the corresponding TAG RAM or TAG RAMS, in one example implementation an access to the TAG RAMs is still required, but in that event the level two way indicator information can be used to restrict the access to only the relevant subset of TAG RAMs and data RAMs relevant for the cache way in question.

Figure 2:
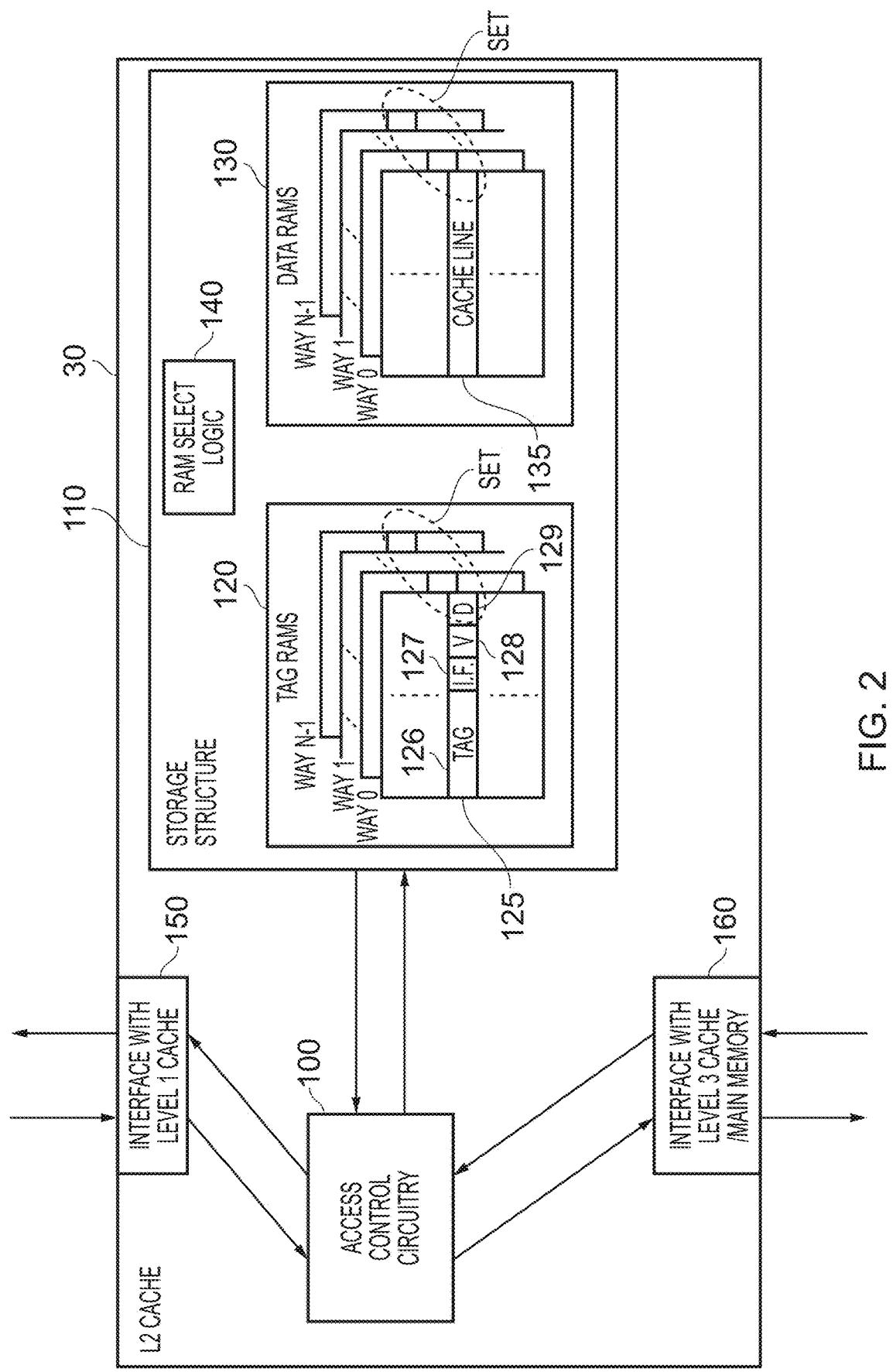
FIG. 2 is a block diagram schematically illustrating components provided within the level two cache of FIG. 1, in accordance with one example implementation.

FIG. 2 is a block diagram schematically illustrating the level two cache 30 in one example implementation. Access control circuitry 100 is used to control access into the storage structure 110 of the level two cache. Those accesses may be performed in response to messages received via the interface 150 from the level one cache, or in response to messages received via the interface 160 from the next lower level cache or main memory.

As shown in FIG. 2, the storage structure 110 is arranged as an N-way set associative storage structure. Each way in the data RAMs 130 used to store data consists of a plurality of cache lines 135, and each cache line may be sized so as to enable a plurality of data items to be stored therein. For each cache line 135 in the data RAMs 130, there is a corresponding entry 125 in the TAG RAMs 120. Each entry 125 is used to store a portion of a memory address that is common to the data items held in the corresponding cache line 135, this memory address portion also being referred to as a TAG value 126. Certain other information can be stored within the entry 125, such as a valid flag 128 to indicate whether the contents of the corresponding cache line 135 are valid, and a dirty flag 129 to identify whether the data stored in the corresponding cache line is dirty, i.e. whether it is more up-to-date that the version held in memory. As also shown in FIG. 2, each entry 125 within the TAG RAMs 120 may further include an inclusion flag 127 which can identify whether the data stored in the corresponding cache line 135 is also cached within the level one cache 20 or not. In one example implementation, this inclusion flag is set when the data is also cached in the level one cache, and is cleared when the data is not also cached in the level one cache.

As shown in FIG. 2, RAM select logic 140 may be provided to allow certain RAMS to be enabled or disabled. Whilst the RAM select logic may enable individual RAMs to be enabled or disabled, in an alternative implementation the RAM select logic may be arranged such that RAMs associated with different ways can be enabled or disabled, Hence, the RAM select logic 140 may be arranged to assert enable signals for each of the different ways.

In response to the level two way indicator information received by the level two cache 30 via the interface 150 in association with a message from the level one cache 20 that requires an access into the level two cache, the access control circuitry 100 can use that information to signal to the RAM select logic 140 which RAMs should be enabled for the current access. Accordingly, the access control circuitry can limit its access to only the subset of RAMs that are relevant to the cache way that has been identified by the level two way indicator information received at the interface 150, thereby enabling a significant saving in power consumption.

Figure 3:
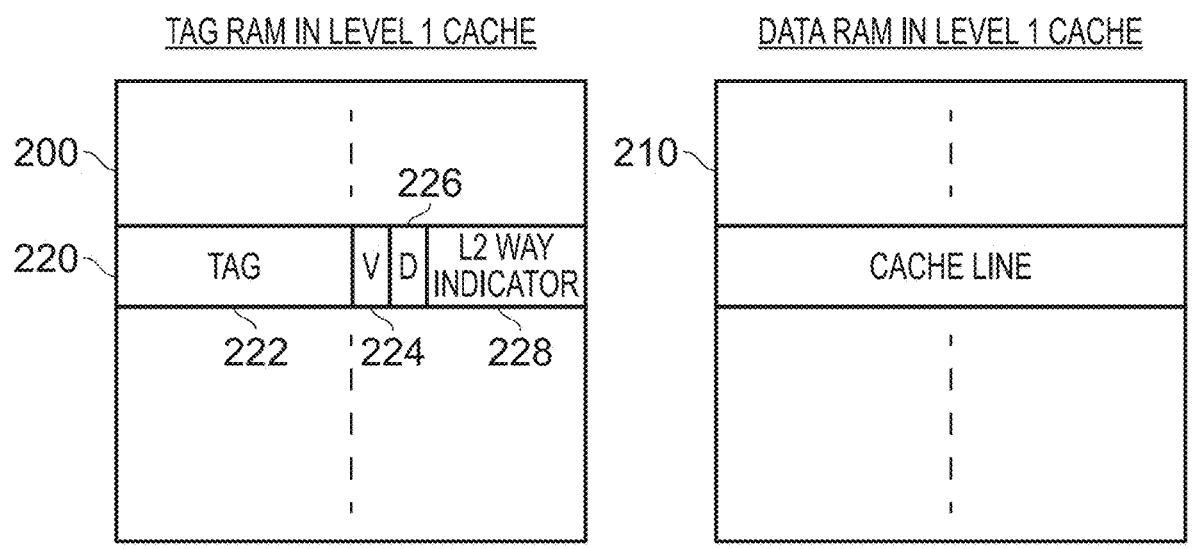
FIG. 3 illustrates the tag RAM and data RAM contents that can be provided within the level one cache of FIG. 1, in accordance with one example arrangement.

The level one cache 20 can be arranged in a variety of ways, and hence for example could be a fully associative cache or a set associative cache. Typically it will provide one or more data RAMs for providing the cache lines of the level one cache, and one or more associated TAG RAMs with corresponding TAG RAM entries for each of the cache lines. As schematically shown in FIG. 3, in association with the data RAM or data RAMs 210 providing the cache lines, one or more TAG RAMs 200 may be provided having corresponding entries 220. As with the earlier discussed TAG RAM entries of the level two cache, each entry 220 may have a first portion 222 for storing a TAG value, a field 224 for storing a valid flag and a field 226 for storing a dirty flag. In one example implementation, the TAG RAM entries can be extended to provide a level two way indicator field 228 for each cache line, which can be populated using the level two way indicator information provided from the level two cache 30 at the time the data is allocated into the level one cache. This enables the level two way indicator information to be retained so that it can in due course be returned to the level two cache in association with any messages from the level one cache that require an access to be performed within the level two cache.

As discussed earlier, there is however no requirement for the level two way indicator 228 to be stored within a TAG RAM of the level one cache, and any other suitable storage structure could be used. For example, this information could be stored within the data RAMs, or could be stored within a dedicated RAM. Alternatively, flop storage structures may be provided within the level one cache for retaining the level two way indicator information.

Figure 4A:
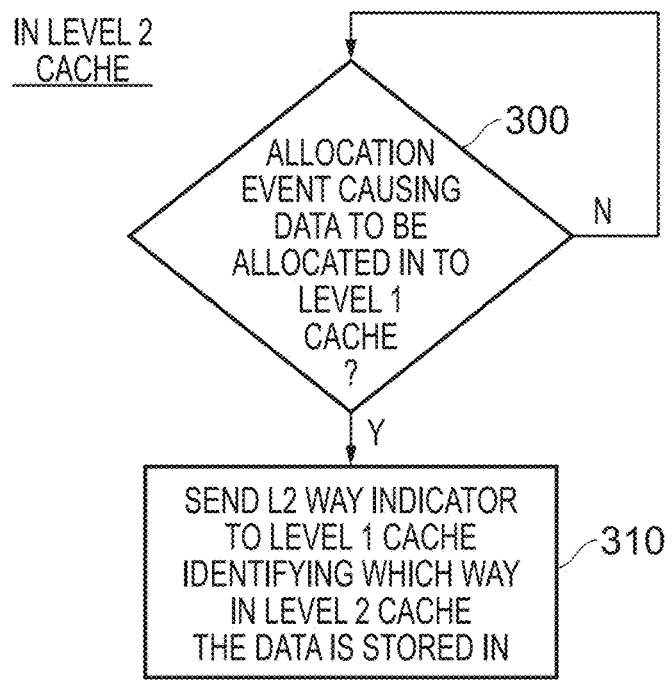
FIGS. 4A and 4B are flow diagrams illustrating steps performed within the level two cache and the level one cache, respectively, of FIG. 1 in response to an allocation event that causes data to be allocated into the level one cache.
Figure 4B:
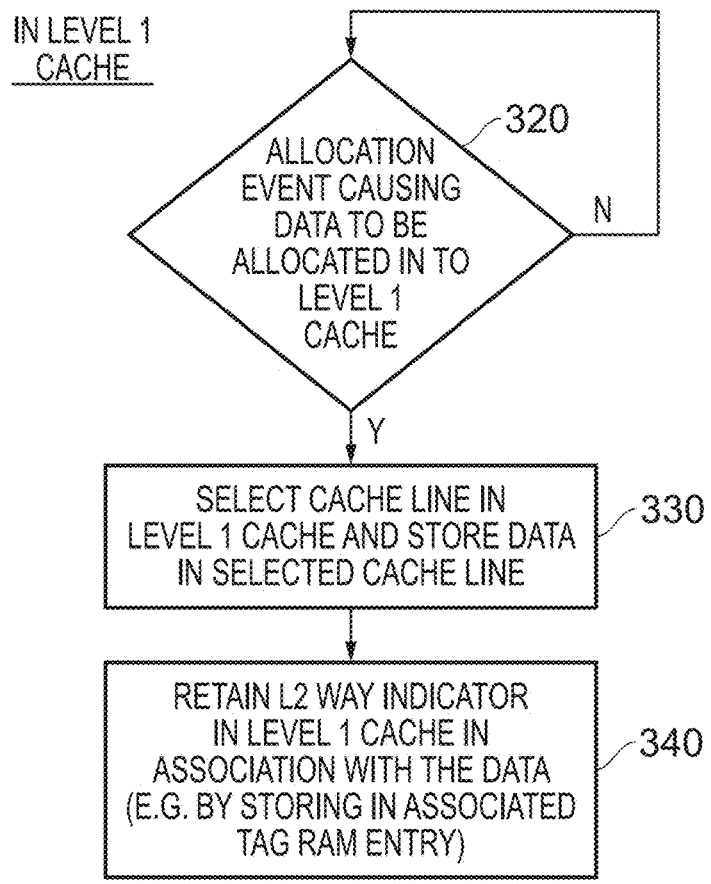

FIGS. 4A and 4B are flow diagrams illustrating steps performed by the level two cache 30 and the level one cache 20, respectively, in response to an allocation event that causes data to be allocated into the level one cache. As shown in FIG. 4A, once such an event is detected at step 300, then at step 310 the level two cache sends a level two way indicator to the level one cache identifying which way in the level two cache has been used to store the data associated with that allocation event.

As shown in FIG. 4B, when such an allocation event is detected at step 320 by the level one cache, then the level one cache is arranged at step 330 to select a cache line in the level one cache using any suitable cache replacement policy, and then stores the data associated with the allocation event into that identified cache line. Further, as indicated by step 340, the level one cache retains the level two way indicator information in association with the data that has been allocated in response to the allocation event. Considering the earlier example of FIG. 3, this can be achieved by storing that level two way indicator information within the associated TAG RAM entry.

Figure 5A:
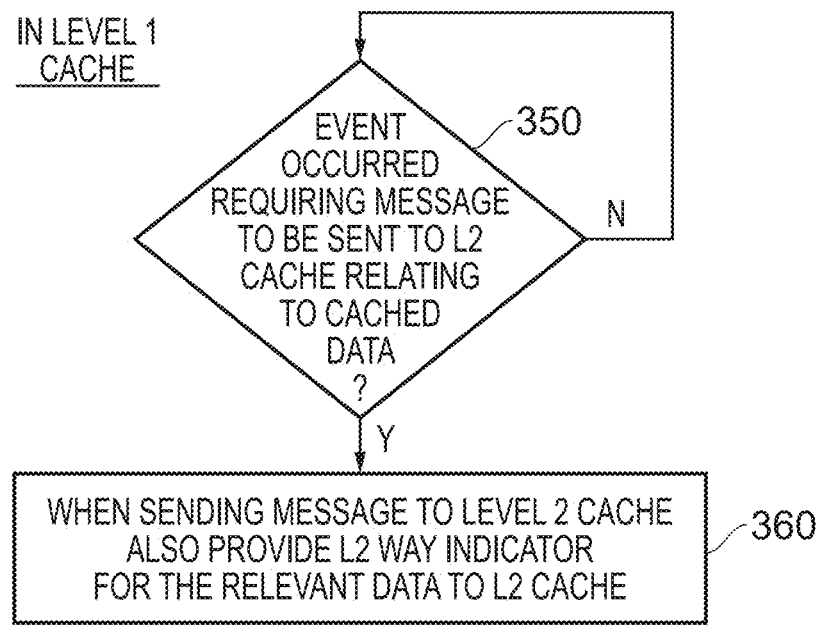
FIGS. 5A and 5B are flow diagrams illustrating steps performed within the level one cache and the level two cache, respectively, of FIG. 1 in response to an event that requires a message to be sent to the level two cache relating to cached data, in accordance with one example implementation.
Figure 5B:
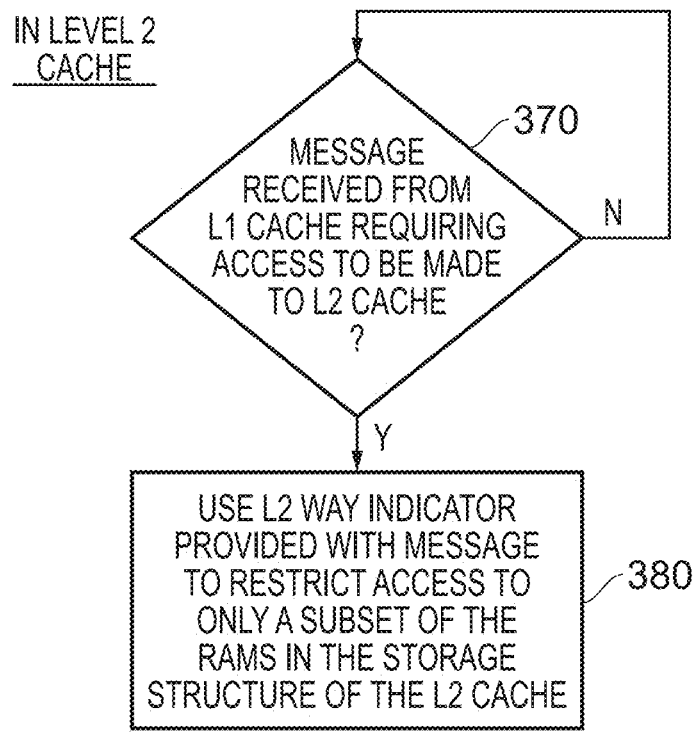

FIGS. 5A and 5B illustrate steps taken by the level one cache and the level two cache, respectively, on occurrence of an event that requires a message to be sent to the level two cache relating to cached data. As shown in FIG. 5A, once such an event is detected at step 350, then at step 360 the level one cache is arranged, when sending the message to the level two cache, to also provide the level two way indicator for the relevant data (i.e. the data to which the message relates) to the level two cache.

As indicated in FIG. 5B, when the level two cache receives such a message at step 370, and assuming that message requires an access to be made into the level two cache, then at step 380 the level two way indicator information that has been provided with the message is used by the access control circuitry 100 of the level two cache to restrict the access to only a subset of the RAMs in the storage structure of the level two cache. In particular, the access can be restricted to those RAMs that are relevant to the cache way identified by the level two way indicator, thereby enabling significant power consumption savings to be realised.

Hence, considering the situation where the message issued by the level one cache is in response to an invalidation operation performed within the level one cache for data at a given memory address, then the access control circuitry in the level two cache can perform an access in order to update the inclusion flag maintained within the TAG RAM entry for the relevant cache line in the level two cache. However, by using the level two way indicator information, it can restrict access to the relevant TAG RAM or TAG RAMs associated with the cache way in question, and all other TAG RAMs can be deselected for that access, thereby reducing power consumption. In the event that the data being invalidated in the level one cache is marked as dirty, it will also typically be necessary to update the data held in the relevant cache line of the level two cache, and in that instance the message from the level one cache will provide a copy of the data held in the level one cache for the given memory address. The way indicator information can then be used to restrict which data RAMs are accessed in order to update the data held in the level two cache, and in particular can exclude any data RAMs that are not associated with the cache way in question.

Such invalidation operations can arise for a variety of reasons, for example due to the level one cache performing an eviction of the data for that given memory address in order to free up space into which data for a different memory address can be allocated, or because a clean and invalidate operation is being performed in the level one cache, for example as part of a cache maintenance operation.

The present technique is also relevant in some situations where an invalidation operation is not being performed in the level one cache. For example, if a clean operation is being performed within the level one cache for a given memory address, and the data cached in the level one cache for that memory address is marked as dirty, then the clean operation will cause that copy of the data held in the level one cache to be propagated to the level two cache, to enable the level two cache's copy of that data to be updated, at which point the copy retained within the level one cache could be marked as being clean. In response to such a message from the level one cache 20, the level two cache 30 will need to perform an access within the relevant data RAM, and also typically within the relevant TAG RAM, but again the level two way indicator information can be used to restrict the access to only the RAMs that are relevant to the cache way indicated, thereby reducing power consumption.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform operations; and
a plurality of caches to store data for reference by the processing circuitry when performing the operations, the plurality of caches forming a cache hierarchy and comprising at least a given cache at a given hierarchical level in the cache hierarchy, and a further cache at a higher hierarchical level than the given hierarchical level;
wherein:
the given cache is arranged as a set associative cache having a plurality of cache ways;
the given cache and the further cache are arranged such that the further cache stores a subset of the data in the given cache;
the given cache is arranged, in response to an allocation event that causes data for a given memory address to be allocated into the further cache, to issue a way indication to the further cache identifying which cache way in the given cache the data for the given memory address is stored in;
the further cache is arranged, in response to the allocation event, to store the data for the given memory address, and to retain the way indication whilst the data for the given memory address remains stored within the further cache; and
the further cache is arranged, when issuing a message to the given cache relating to the data for the given memory address, and which requires an access to be made in the given cache, to provide the way indication to the given cache for use in controlling the access to the given cache.

2. An apparatus as claimed in claim 1, wherein:
the given cache comprises a storage structure to store the data cached within the given cache, and access control circuitry to control access to the storage structure, the storage structure comprising a plurality of storage blocks; and
the access control circuitry is arranged, when performing the access required by the message, to exclude one or more of the storage blocks from the access as determined from the way indication.

3. An apparatus as claimed in claim 2, wherein the access control circuitry is arranged, when performing the access, to only access one or more of the storage blocks associated with the cache way identified by the way indication provided from the further cache.

4. An apparatus as claimed in claim 2, wherein:
each of the storage blocks has a select signal, and the access control circuitry is arranged to disable the select signal for each storage block to be excluded from the access.

5. An apparatus as claimed in claim 2, wherein:
the plurality of storage blocks comprises a plurality of data storage blocks, each data storage block comprising a plurality of caches lines used to store data, and a plurality of address indication storage blocks, each address indication storage block having a plurality of entries, where each entry is used to store a memory address indication for the data stored in a corresponding cache line; and
each cache way is formed by at least one address indication storage block and at least one data storage block.

6. An apparatus as claimed in claim 5, wherein the access control circuitry is arranged to exclude from the access all address indication storage blocks that are not associated with the cache way identified by the way indication.

7. An apparatus as claimed in claim 5, wherein the access control circuitry is arranged to exclude from the access all data storage blocks that are not associated with the cache way identified by the way indication.

8. An apparatus as claimed in claim 5, wherein the access control circuitry is arranged to exclude from the access all address indication storage blocks, and to limit the access to the at least one data storage block associated with the cache way identified by the way indication.

9. An apparatus as claimed in claim 1, wherein the message is issued by the further cache in response to an invalidation operation performed within the further cache for the data for the given memory address.

10. An apparatus as claimed in claim 9, wherein the access is performed by the given cache in response to the message in order to update an inclusion flag maintained by the given cache in association with the data for the given memory address as stored in the given cache, to identify that the further cache no longer stores that data.

11. An apparatus as claimed in claim 10, Wherein when a version of the data for the given memory address as stored in the further cache is more up to date than a version of the data stored in the given cache, the message is arranged to provide the version of the data from the further cache, and the access by the given cache in response to the message is further arranged to update the version of the data as held in the given cache.

12. An apparatus as claimed in claim 9, wherein the invalidation operation is performed due to one of:

an eviction from the further cache of the data for the given memory address; and a clean and invalidate operation performed in the further cache for the data for the given memory address.

13. An apparatus as claimed in claim 1, wherein the message is issued by the further cache in response to a clean operation performed within the further cache for the data for the given memory address, where subsequent to the clean operation being performed the data for the given memory address is retained within the further cache.

14. An apparatus as claimed in claim 1, wherein the further cache is arranged to retain the way indication within a storage structure of the further cache that is also used to store memory address indications for the data stored in the further cache.

15. An apparatus as claimed in claim 1, wherein the cache hierarchy comprises a level 1 cache at a highest hierarchical level and one or more further caches each of which is at an associated lower hierarchical level in the cache hierarchy.

16. An apparatus as claimed in claim 15, wherein the given cache and the further cache are at adjacent hierarchical levels in the cache hierarchy.

17. An apparatus as claimed in claim 16, wherein the further cache is the level 1 cache, and the given cache is a level 2 cache in the cache hierarchy.

18. An apparatus as claimed in claim 1; wherein the data stored in the plurality of caches comprises at least one of:
   data hems on which the operations are performed; and
   instructions used to identify to the processing circuitry the operations to be performed.

19. A cache device for use in a cache hierarchy, comprising:
   a storage structure to store cached data, wherein the storage structure is arranged as a set associative storage structure having a plurality of cache ways; and
   access control circuitry to control access to the storage structure;
   wherein:
   the cache device forms a given cache at a given hierarchical level in the cache hierarchy and is arranged such that a further cache at a higher hierarchical level in the cache hierarchy than the given hierarchical level stores a subset of the data in the given cache;
   the given cache is arranged, in response to an allocation event that causes data for a given memory address to be allocated into the further cache, to issue a way indication to the further cache identifying which cache way in the given cache the data for the given memory address is stored in; and
   the access control circuitry is arranged, in response to a message received from the further cache relating to the data for the given memory address, and which requires an access to be made in the given cache, to control access to the given cache in dependence on the way indication returned by the further cache to the given cache with the message.

20. A cache device for use in a cache hierarchy, comprising:
   a storage structure to store cached data; and
   a way indication storage to retain way indicators;
   wherein:
   the cache device is coupled to a given cache at a given hierarchical level in the cache hierarchy, where the given cache has a set associative storage structure having a plurality of cache ways;
   the cache device forms a further cache at a higher hierarchical level than the given hierarchical level;
   the further cache is arranged to store a subset of the data in the given cache;
   the further cache is arranged; in response to an allocation event that causes data for a given memory address to be allocated into the further cache, to receive from the given cache a way indication identifying which cache way in the given cache the data for the given memory address is stored in;
   the further cache is further arranged, in response to the allocation event, to store the data for the given memory address in the storage structure, and to retain the way indication in the way indication storage whilst the data for the given memory address remains stored within the storage structure; and
   the further cache is arranged, when issuing a message to the given cache relating to the data for the given memory address, and which requires an access to be made in the given cache, to provide the way indication to the given cache for use in controlling the access to the given cache.

21. A method of managing caches in a cache hierarchy, comprising:
   providing a plurality of caches in the cache hierarchy to store data for reference by processing circuitry when performing operations, the plurality of caches comprising at least a given cache at a given hierarchical level in the cache hierarchy, and a further cache at a higher hierarchical level than the given hierarchical level;
   arranging the given cache as a set associative cache having a plurality of cache ways;
   arranging the given cache and the further cache such that the further cache stores a subset of the data in the given cache;
   issuing from the given cache, in response to an allocation event that causes data for a given memory address to be allocated into the further cache, a way indication to the further cache identifying which cache way in the given cache the data for the given memory address is stored in;
   in response to the allocation event, storing in the further cache the data for the given memory address, and retaining in the further cache the way indication whilst the data for the given memory address remains stored within the further cache; and
   when issuing from the further cache a message to the given cache relating to the data for the given memory address, which requires an access to be made in the given cache, providing the way indication to the given cache for use in controlling the access to the given cache.

* * * * *